US012550804B2

(12) United States Patent
López et al.

(10) Patent No.: US 12,550,804 B2
(45) Date of Patent: Feb. 17, 2026

(54) MODULAR AND RECONFIGURABLE ELECTRIC ROBOT FOR AGRICULTURE

(71) Applicants: PLANTIUM S.A., Villa Constitución (AR); Jorge A. Gentili, Villa Constitución (AR)

(72) Inventors: Germán López, Villa Constitución (AR); Esequiel Milazzo, Arequito (AR); Federico Tomi, Arequito (AR); Matías Quaglia, Cañada de Gómez (AR)

(73) Assignees: PLANTIUM S.A., Villa Constitución (AR); GENTILI, JORGE A., Villa Constitución (AR)

( * ) Notice: Subject to any disclaimer, the term of this patent is extended or adjusted under 35 U.S.C. 154(b) by 612 days.

(21) Appl. No.: 17/909,704

(22) PCT Filed: Mar. 5, 2020

(86) PCT No.: PCT/IB2020/051925
§ 371 (c)(1),
(2) Date: Aug. 8, 2023

(87) PCT Pub. No.: WO2021/176253
PCT Pub. Date: Sep. 10, 2021

(65) Prior Publication Data
US 2023/0380321 A1 Nov. 30, 2023

(51) Int. Cl.
*A01B 69/04* (2006.01)
*A01B 51/02* (2006.01)
(52) U.S. Cl.
CPC .......... *A01B 69/008* (2013.01); *A01B 51/026* (2013.01)
(58) Field of Classification Search
None
See application file for complete search history.

(56) References Cited

U.S. PATENT DOCUMENTS 10,028,442 B1 * 7/2018 Crosby ............... G05D 1/0293
2011/0253466 A1 * 10/2011 Sedoni ..................... B60K 6/32
180/65.31

(Continued)

FOREIGN PATENT DOCUMENTS

CN      101323328 A    12/2008
CN      101990796 A     3/2011

(Continued)

OTHER PUBLICATIONS

Grimstad, Lars and Johan, Pål, The Thorvald II Agricultural Robotic System, Sep. 30, 2017, 16 pages, Robotics vol. 6 issue 4.

*Primary Examiner* — Tamara L Weber
(74) *Attorney, Agent, or Firm* — MUNCY, GEISSLER, OLDS & LOWE, P.C.

(57) ABSTRACT

A modular and reconfigurable autonomous electric robot capable of adapting to any type of condition and work in an agricultural environment, comprising: a symmetrical chassis comprising a front part, a middle part and a rear part; a power supply located at the front of the chassis; an implement located at the rear part of the chassis; two wheel assemblies each located at transversely opposite ends of the front of the chassis and two wheel assemblies each located at transversely opposite ends of the rear of the chassis; a GNSS unit to geolocate the electric robot in real time; and a processing and control module that controls the electric robot and is in data communication with the GNSS unit, where each wheel assembly located at the front of the chassis comprises a wheel with an electric motor directly coupled to the wheel.

18 Claims, 7 Drawing Sheets

(56) References Cited

U.S. PATENT DOCUMENTS

| | | | |
|---|---|---|---|
| 2016/0037707 A1* | 2/2016 | Bebernes | G05D 1/0212 |
| | | | 180/6.48 |
| 2017/0227969 A1* | 8/2017 | Murray | A01D 42/00 |
| 2018/0263198 A1* | 9/2018 | Bertino | A01B 69/008 |
| 2019/0094857 A1* | 3/2019 | Jertberg | G05D 1/0282 |
| 2019/0200510 A1 | 7/2019 | Chrysanthakopoulos et al. | |
| 2020/0000002 A1 | 1/2020 | Chrysanthakopoulos et al. | |
| 2020/0276872 A1* | 9/2020 | Azuma | B60G 15/062 |
| 2020/0315097 A1* | 10/2020 | Desai | B60K 6/26 |

FOREIGN PATENT DOCUMENTS

| | | |
|---|---|---|
| KR | 1020130011166 | 1/2013 |
| WO | WO2016/191825 A1 | 12/2016 |
| WO | WO2017/161431 A1 | 9/2017 |
| WO | WO2019/193080 A1 | 10/2019 |

\* cited by examiner

MODULAR AND RECONFIGURABLE ELECTRIC ROBOT FOR AGRICULTURE

FIELD OF THE INVENTION

The present invention relates to the field of electric robots. More particularly, the present invention relates to an electric robot for agricultural applications that can be adapted to any type of condition and work in an agricultural environment and that can operate autonomously.

BACKGROUND OF THE INVENTION

There are various types of vehicles that are implemented in the technical field related to agriculture, among them are electric robots, which represent an advantageous alternative for farmers due to their versatility to adapt to different working conditions. Additionally, robots in general constitute lighter vehicles and represent a lower cost compared to conventional agricultural machines, which due to their weight compact the soil, negatively affecting production.

Furthermore, robots can be programmed to perform tasks when favorable weather conditions (humidity, temperature, wind, etc.) are met, regardless of the time of the day. They enable agricultural productivity to be increased by automating tasks precisely and tirelessly, while farmers can handle other procedures or manual tasks. Therefore, it is evident that the use of robots makes it possible to make more efficient use of resources, save inputs and generate less impact on the ecosystem.

As it is known, on a field a multiplicity of tasks are carried out for agricultural purposes, such as plowing, applying fertilizers, sowing, watering, applying pesticides, harvesting, among many others. That is why the use of agricultural robots that can be adapted or configured to perform each of these tasks would be very beneficial for farmers.

There are different electric robots, such as the electric robot disclosed in the publication "The Thorvald II Agricultural Robotic System" by Lars Grimstad and Pål Johan. Said electric robot is a modular agricultural robot both in hardware and software, which can be reconfigured to operate in different conditions such as open fields, tunnels or greenhouses, being able to adjust the distance between wheels, load capacity, power, among others features. For its propulsion, the robot uses one or more drive modules that have electric motors that are connected to the wheels by means of a transmission mechanism.

However, it does not have a structural chassis, to which all parts and components are mounted, but instead uses aluminum tubes (of variable length) to interconnect the modules. This limits its ability to reconfigure for small loads and low power.

The publication "Mobile Robot for Weeding", by Tommy Ertbølle Madsen and Hans Lavdal Jakobsen, discloses an autonomous agricultural robot vehicle for weed control. Said electric robot to propel itself uses a brushless type electric motor and a reduction mechanism to drive the wheels.

Furthermore, it also has a smaller chassis and low power motors (0.5 kW) compared to the robot motors of the present application. In addition, the robot from the publication "Mobile Robot for Weeding" uses an independent control on each wheel as the steering system, by means of an electric motor at the top.

Patent application WO 2017/161431 A1 in the name of EIRENE PROJETOS E CONSULTORIA LTDA and published on Sep. 28, 2017 discloses an unmanned ground vehicle for selective spraying, and a spraying method using said vehicle.

Said vehicle has a chassis assembly whose main function is vertical spraying and is capable of receiving different functional modules on its quick coupling platform. The vehicle is operated through a battery powered electrical supply, having an integral four-wheel drive system, an independent mechanical suspension system, and independent steering angle control.

The robot of the patent application WO 2017/161431 A1 has steering motors on each wheel which implies high equipment cost, high mechanical complexity and high complexity in vehicle control.

Each of the previously cited documents discloses autonomous agricultural robots or vehicles. However, each of them has a transmission mechanism, for example a reduction mechanism, between the motor that drives the wheels and the wheels. With an intermediate mechanism, the energy efficiency of the electric robot is inevitably reduced. Additionally, said intermediate mechanism inevitably requires lubrication and maintenance, since it will be subject to greater wear.

Furthermore, said agricultural robots or vehicles, based on what is disclosed in their corresponding documents, do not exceed the speed of 10 km/h in the field or their working speeds are not specified. The robots or agricultural vehicles commonly used in the state of the art are intended to work with light loads and at low speeds (less than 10 km/h).

On the other hand, there are other prior art documents that disclose agricultural robots that use hydraulic motors, which makes said robots more expensive, or that use combustion motors, which make them polluting the environment.

Consequently, there is a need to provide an electric robot that is easily configurable in order to adapt to different conditions and agricultural work, being able to perform different functions in an agricultural field, the robot not having a transmission mechanism between the motor and the wheels, and that it can operate in an optimal range of speeds and torques, allowing the transport of high loads and maintaining its horizontality and stability.

BRIEF DESCRIPTION OF THE INVENTION

Based on the above considerations, the present invention provides an electric robot that allows working at high speeds (for example, up to 20 km/h) and with high loads, which does not use any power transmission mechanism, which ensures the stability and horizontality of the vehicle at high speeds, which adapts to different agricultural conditions and work, and which allows it to be easily reconfigured in order to carry out different agricultural operations.

Consequently, an object of the present invention is a modular and reconfigurable autonomous electric robot capable of adapting to any type of condition and work in an agricultural environment, comprising:

- a chassis with transverse and longitudinal symmetry comprising a front part, a middle part and a rear part;
- a power supply located at the front of the chassis;
- an implement for agricultural work located at the rear of the chassis;
- two wheel assemblies each located at transversely opposite ends of the front of the chassis and two wheel assemblies each located at transversely opposite ends of the rear of the chassis;
- a GNSS unit to geolocate the electric robot in real time; and a control and processing module that controls the electric robot and is in data communication with the GNSS unit, wherein each wheel assembly located at the front of the chassis comprises a wheel with an electric motor directly coupled to the wheel.

In an embodiment of the present invention, the chassis comprises at least two crossbars, preferably a front crossbar and a rear crossbar which essentially constitute the front and the rear, respectively.

In an embodiment of the present invention, the chassis comprises at least two stringers, preferably two lateral stringers and more preferably two lateral stringers and at least one central stringer, which essentially constitute the middle part of the chassis and connect the front part with the rear part thereof.

In an embodiment of the present invention, the power supply is selected from the group consisting of a hybrid power supply and an electrical power supply.

In a preferred embodiment of the present invention, the hybrid power supply consists of a generator and rechargeable batteries.

In a preferred embodiment of the present invention, the electrical power supply consists of rechargeable batteries, or an interchangeable battery bank or pack.

In an embodiment of the present invention, the batteries are selected from the group that includes lead, nickel-cadmium, lithium batteries, among others.

In an embodiment of the present invention, the chassis is shaped to be able to place a component such as a container, a tank or a hopper in the middle of it to contain agricultural supplies.

In an embodiment of the present invention, the implement is selected so as to perform one or more of the following functions: distribution of agricultural supplies, such as spraying, sowing, fertilization; weed control without agrochemicals; trailer for loading and unloading; measurement and sensing of soil properties, among others.

In a preferred embodiment of the present invention, the implement can be automatically driven by the processing and control module.

In an embodiment of the present invention, each wheel assembly located at the front has a suspension formed by a spring and a damper.

In a preferred embodiment of the present invention, each of the wheel assemblies located at the front of the chassis and the wheel assemblies located at the rear of the chassis have a suspension formed by a spring and a damper.

In an embodiment of the present invention, each wheel assembly located in the front part of the chassis comprises a power control module for its corresponding electric motor.

In an embodiment of the present invention, each wheel assembly located at the rear of the chassis comprises a wheel with an electric motor directly coupled to the wheel.

In an embodiment of the present invention, each wheel assembly located at the rear of the chassis comprises a power control module for the electric motor.

In an embodiment of the present invention, each wheel assembly located at the rear part of the chassis comprises a caster wheel and a caster axle, where the caster axle has a rotation axis that is inclined a determined angle of inclination with respect to a vertical line and allows the caster wheel to rotate around the axis.

In an embodiment of the present invention, the angle of inclination of the axis of rotation of the caster axle with respect to a vertical line is between 1° and 20°, preferably between 5° and 15°, more preferably between 6° and 10°, even more preferably is 8°.

In an embodiment of the present invention, the electric motor directly coupled to a corresponding wheel is a brushless type electric motor.

In an embodiment of the present invention, the processing and control module is in data communication with an external server.

In an embodiment of the present invention, the electric robot comprises an inertial measurement unit that is in data communication with the processing and control module.

In an embodiment of the present invention, the electric robot comprises at least one environment perception sensor selected from the group consisting of lidar sensors, ultrasonic sensors, a radar, RGB cameras, RGB-D cameras, thermal cameras, infrared cameras, among others, wherein said at least one sensor of environment perception is in data communication with the processing and control module.

In an embodiment of the present invention, the electric robot comprises at least one sensor for monitoring the status of the electric robot selected from the group consisting of fuel level sensors, wheel pressure sensors, temperature sensors of different points of the electric robot, position sensors of the mobile parts of the electric robot, sensors of the quantity of supplies for agricultural work, among others, wherein said at least one sensor for monitoring the state of the robot is in data communication with the processing and control module.

In an embodiment of the present invention, the electric robot comprises a wireless communication system comprising communication modules such as LPWAN, Bluetooth, WiFi and mobile Internet.

DETAILED DESCRIPTION OF THE INVENTION

The electric robot of the present invention will now be described in detail with reference to FIGS. 1 to 8B, which illustrate, by way of example, preferred embodiments of the invention and the different elements that compose the same.

In each of the Figures, the same numerical references are used to designate similar or equal elements of the device of the present invention.

Figure 1:
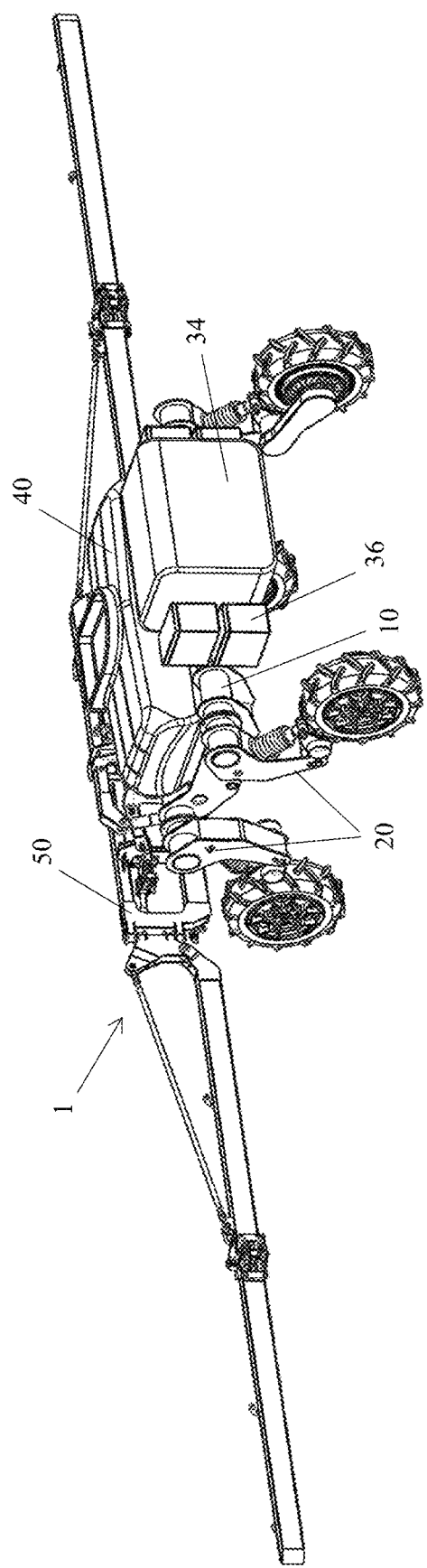
FIG. 1 shows an isometric perspective view of an embodiment of the electric robot of the present invention.
Figure 2A:
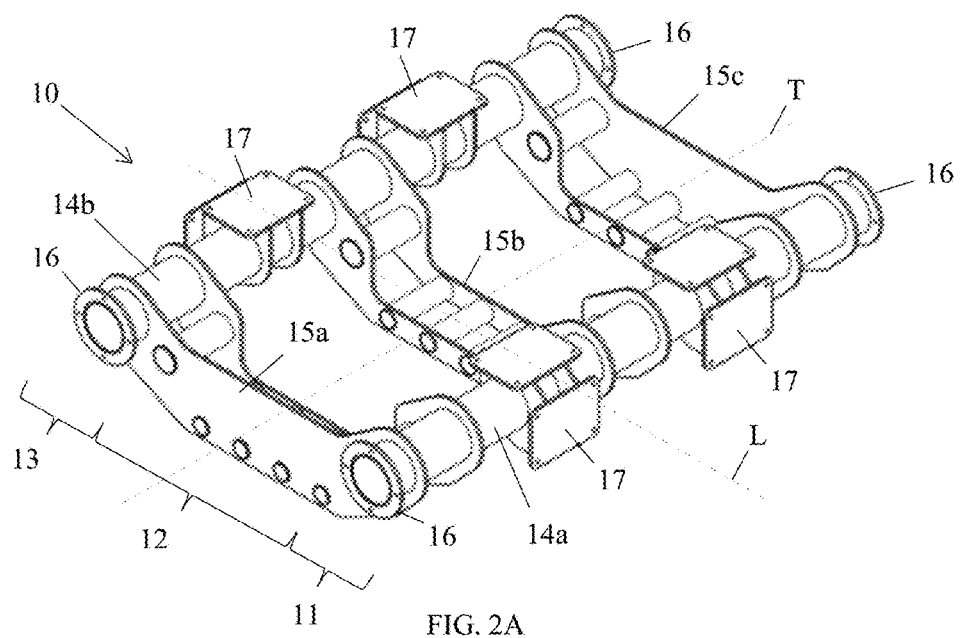
FIGS. 2A to 2D show respectively an isometric perspective view, a front view, a left side view and a top view of the chassis of the electric robot of the present invention.
Figure 2B:
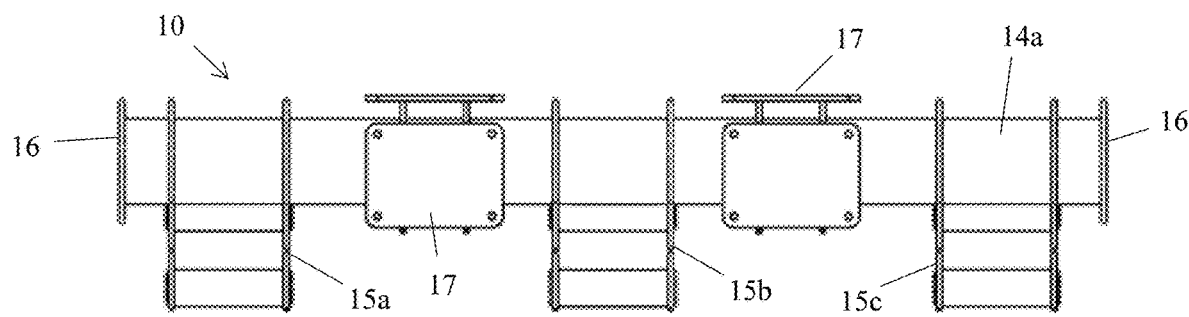
Figure 2C:
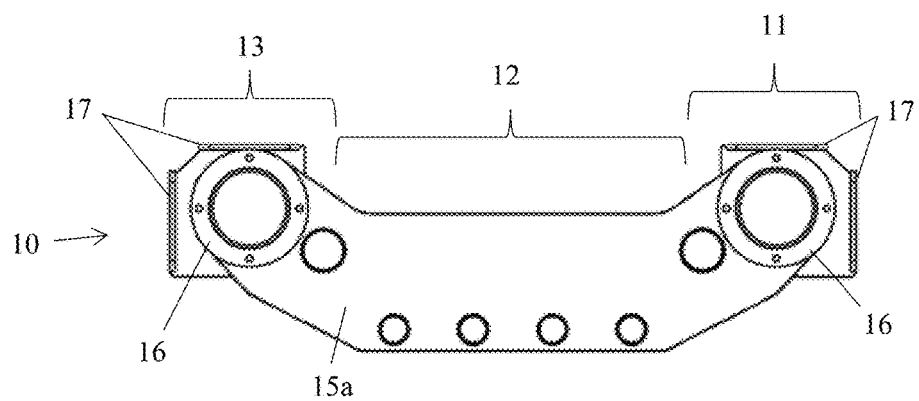
Figure 2D:
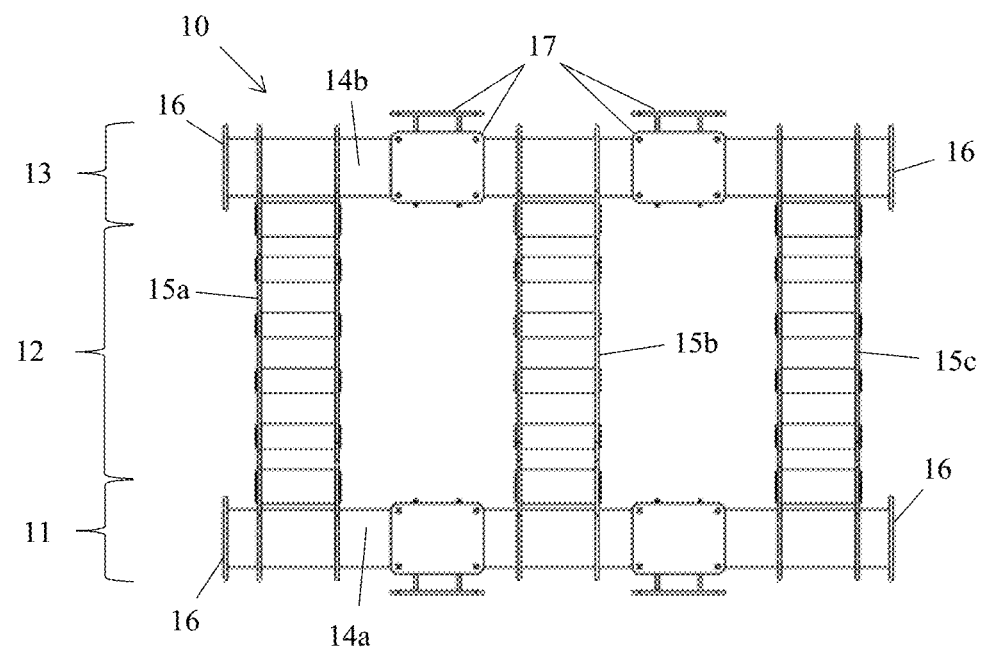

Referring to FIG. 1, an isometric perspective view of an embodiment of the electric robot 1 of the present invention can be seen, which generally comprises a chassis 10, a wheel assembly 20 in each corner of the chassis 10, a generator 34 and rechargeable batteries 36 as a power supply, a component 40 and an implement 50 for the distribution of agricultural supplies. Said elements will be described in greater detail and precision below with reference to the other Figures.

Referring to FIGS. 2A to 2D, different views of an embodiment of the symmetrical chassis 10 of the electrical robot 1 of the present invention, shown in FIG. 1 can be seen. In particular, FIG. 2A corresponds to an Isometric perspective view of chassis 10, FIG. 2B corresponds to a front view of chassis 10, FIG. 2C corresponds to a left side view of chassis 10, and FIG. 2D corresponds to a top view of chassis 10.

The symmetrical chassis 10 has three parts, a front or front part 11, a middle part 12 and a rear or rear part 13, corresponding respectively to the front, middle and rear parts of the electric robot of the present invention, wherein said chassis 10 is formed by two cross beams or crossbars, in particular a front crossbar 14a and a rear crossbar 14b, and by three longitudinal cross beams or stringers, in particular two lateral stringers 15a and 15c, and a central stringer 15b. It should be noted that in some other embodiments said central stringer 15b may not be included so that the electric robot has only the lateral stringers 15a and 15c.

Additionally, as can be seen directly through FIGS. 2A to 2D, said chassis 10 is symmetrical because it presents two symmetry planes, a symmetry plane that corresponds to the vertical plane that passes through the longitudinal axis L and another symmetry plane that corresponds to the vertical plane that passes through the transverse axis T, the vertical being understood as the direction perpendicular to both the longitudinal axis L and the transverse T, which are horizontal axes.

The crossbars 14a and 14b mainly constitute the front part 11 and the rear part 13, respectively, of the chassis 10. For their part, the stringers 15a, 15b and 15c mainly constitute the middle part 12 of the chassis 10 and structurally join the front part 11 with the rear part 13 of chassis 10.

The crossbars 14a and 14b preferably consist of hollow circular section profiles, while each of the stringers 15a, 15b and 15c consists, by way of example, of two parallel plates that are laterally spaced from each other and joined by cylindrical bars. Said parallel plates have a central section where the upper and lower surfaces are flat and horizontal, that is, parallel to both the longitudinal axis L and the transverse axis T. As can be seen from FIG. 2A, the plates that are in the sides or periphery of the chassis 10 have an upper surface that is higher than the upper surfaces of the other plates. In this way, the chassis 10 is shaped to be able, by way of example, to place in the middle part 12 a container, a tank, a hopper, etc., containing agricultural supplies such as seeds, agrochemicals or whatever corresponds according to the task to be performed by the electric robot, and that said container, tank, or hopper fits properly well inside the middle part 12 of the electric robot.

The crossbars 14a and 14b have flange-like connections 16 at each of their ends so that different configurations of wheel assemblies can be linked to the chassis 10, as will be seen later. Additionally, the crossbars 14a and 14b comprise in their middle part linkage means 17 so as to allow the power supply and implements to be linked with the chassis 10. Such linkage means 17 may be, by way of example, plates facing up and out with respect to the chassis 10 and are located in the middle part of the crossbars 14a and 14b, for example, at a distance of approximately one third of their length with respect to one of their ends, and at a distance of approximately one third of its length with respect to the other of its ends.

It should be noted that the chassis crossbars can have different lengths so that the electric robot of the present invention is easily configurable and, therefore, scalable. Also, in case a robot enlargement is needed, more stringers and more crossbars can easily be added to the electric robot of the present invention. Consequently, aspects such as, for example, the gauge of the electric robot, would be easily configurable.

The chassis 10 can be manufactured from some material selected from the group consisting of metallic materials, preferably steels or aluminum, and polymeric materials. In a preferred embodiment, the chassis 10 is made of high strength steel.

Figure 3A:
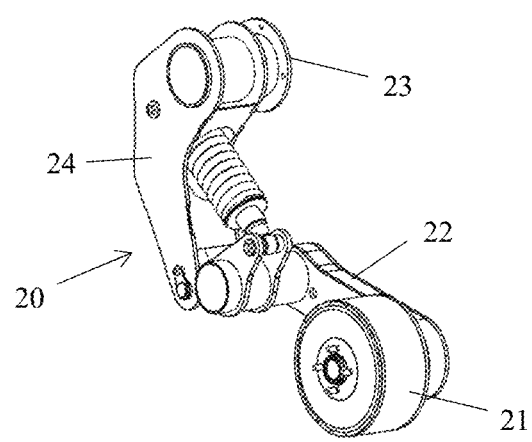
FIG. 3A shows an isometric perspective view of one embodiment of a wheel assembly, without mounting the wheel, comprising an electric motor.

Referring to FIG. 3A, an isometric perspective view of one embodiment of a wheel assembly 20 can be seen. Wheel assembly 20 comprises a drive wheel (shown as wheel 29a in FIG. 5A). This is because the wheel assembly 20, as can be seen from FIG. 3A, comprises an electric motor 21.

Additionally, the wheel assembly 20 comprises an articulated arm 22, a link 23 and a suspension 24. In a preferred embodiment, the wheel assembly 20 comprises a power control module (not shown) of the electric motor 21 which is preferably placed on the articulated arm 22 although it can also be placed on the chassis of the electric robot. Said power control module makes it possible to control the electric motor 21 so that it has a high performance and guarantees good operation of the electric robot.

Electric motor 21 is directly coupled to wheel 29a (see FIG. 5A) which is not shown in FIG. 3A in order to achieve a better understanding of wheel assembly 20. In a preferred embodiment, the electric motor 21 is a brushless electric motor, i.e. without brushes.

Figure 5A:
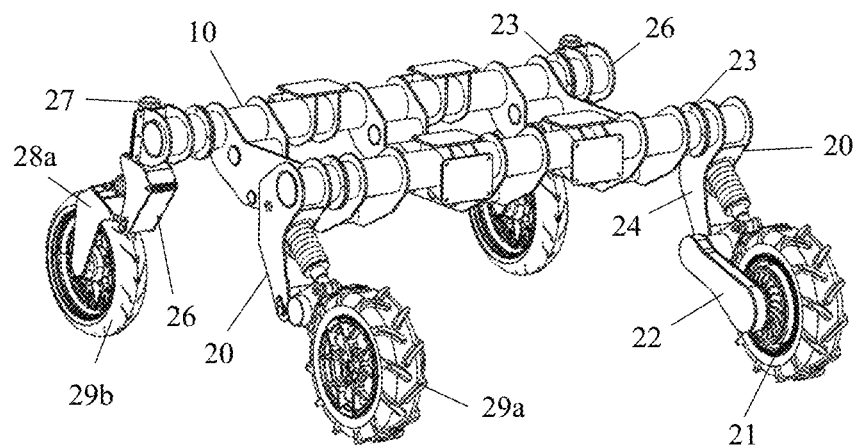
FIGS. 5A and 5B show an isometric perspective view and a left side view, respectively, of an embodiment of the chassis with wheel assemblies of the electric robot of the present invention presenting a certain configuration regarding direction and traction.

As the electric motor 21 is directly coupled to the wheel 29a, shown in FIG. 5A, the use of mechanical transmissions or intermediate parts is avoided, which allows greater mechanical simplicity in the design. Furthermore, as the electric motor 21 is brushless type, there is no need for lubrication since there are no parts to wear out. In this way, the reliability of the electric robot increases, maintenance is minimal and the efficiency of the energy used to drive the robot is maximized. In addition, in case the power control module, mentioned above, is integrated in the articulated arm 22, it is possible to save between 5% and 10% of energy due to the fact that there is less power wiring (number of cables) which reduces losses due to Joule effect, thus improving electrical efficiency.

The brushless type electric motor 21 that is used to drive the electric robot of the present invention is specifically designed to allow the electric robot to operate in the range of speeds and torques that said robot demands in order to adapt to any type of condition and agricultural work. Furthermore, said electric motor 21 regenerates energy in braking, which favors a lower energy consumption.

The electric motor 21 is coupled to one end of the articulated arm 22, which through another end is coupled to the suspension 24 of the wheel assembly 20. The suspension 24 comprises a spring and a damper, which allows, in general, maintaining the contact force of the wheels with the ground, supporting the load of the electric robot, absorbing the irregularities that may exist in the work terrain, and favoring the stability of the robot when turning or braking.

The flange-like joint 23 of the wheel assembly 20 allows said assembly to be coupled to the chassis 10 of the electric robot. This is achieved by coupling the joint 23 with any of the joints 16 of the chassis 10 of the electric robot by means of mechanical fixing, for example, by bolts or studs.

Figure 3B:
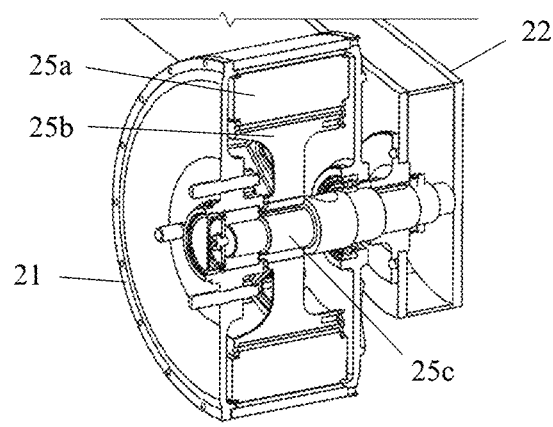
FIG. 3B shows a cross section of the electric motor of the wheel assembly of FIG. 3A.

FIG. 3B shows a cross section of the electric motor 21 of FIG. 3A, where components that make up the electric motor 21 can be seen such as the rotor 25a, the stator 25b and the shaft 25c coupled to the stator 25b. Said electric motor 21 comprises fins (not shown) on the inner cover of rotor 25a so as to dissipate the heat generated in rotor 25a by conduction and convection.

The wheel assembly 20 is preferably located at each end of the front of the electric robot. However, it should be noted that a wheel assembly 20 can be attached to each joint 16 of the electric robot chassis 10 such as in the embodiment illustrated in FIGS. 6A and 6B. In such an embodiment, the electric robot has four wheel assemblies 20, i.e. two wheel assemblies 20 each located at transversely opposite ends of the front of the electric robot, and two wheel assemblies 20 each located transversely at each end opposite sides of the rear of the electric robot.

On the other hand, in another embodiment shown in FIGS. 5A and 5B, the electric robot has two wheel assemblies 20 each located at transversely opposite ends of the front of the electric robot, and two wheel assemblies 26, which will be described below, each located at transversely opposite ends of the rear of the electric robot.

Figure 4A:
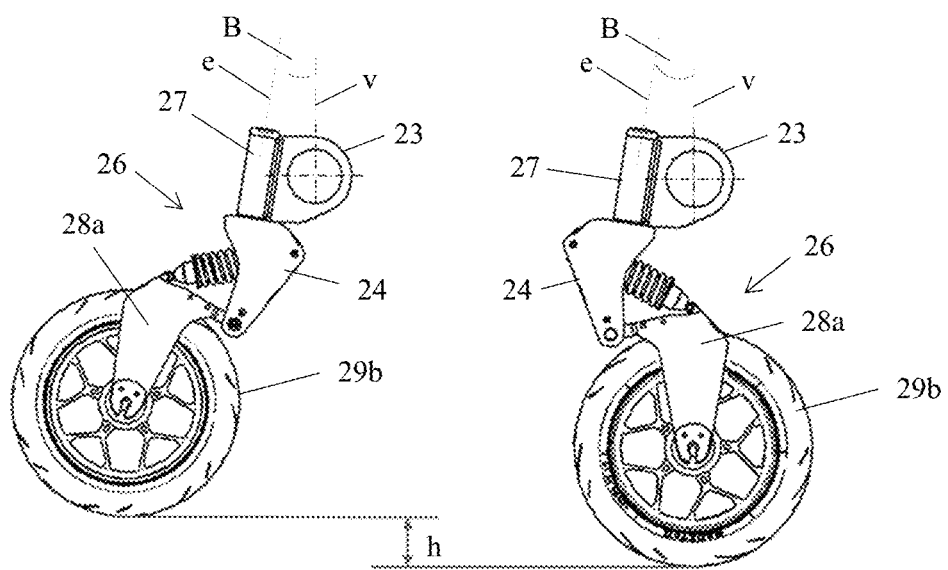
FIG. 4A shows an embodiment of a wheel assembly comprising a caster wheel in a first position and in a second position.

Referring now to FIG. 4A, an embodiment of a wheel assembly 26 comprising wheel 29b, which is a caster wheel, can be seen in a first position (assembly 26 on the left) and in a second position (assembly 26 on the right). The wheel assembly 26, as can be seen from FIG. 4A, comprises a fork 28a that holds the wheel 29b, a joint 23, a suspension 24, and a caster axle 27 from which the wheel 29b can rotate.

Wheel assembly 26 is preferably located at each end of the rear of the electric robot and, unlike wheel assembly 20, does not have a motor directly or indirectly coupled to wheel 29b, thus wheel 29b being a caster wheel.

The wheel assembly 26, like the wheel assembly 20, is linked to the chassis 10 by coupling the joint 23 with any of the joints 16, for example, those of the rear crossbar 14b of the chassis 10 of the electric robot by mechanical fixing, e.g. bolts or studs. The caster axle 27 has a rotation axis e that allows the suspension 24 and, in turn, the wheel 29b to freely rotate around said rotation axis e. This axis of rotation e is inclined with respect to a vertical axis v an angle B, called the angle of inclination, whose value is between 1° and 20°. In a preferred embodiment, the angle of inclination B is between 5° and 15°. In a more preferred embodiment, the angle of inclination B is between 6° and 10°. In an even more preferred embodiment, the angle of inclination B is 8°. Therefore, the wheel assembly 26 is inclined at an angle B with respect to the vertical axis v.

It is necessary to point out that, in case the angle of inclination B takes values above 20° of inclination, problems would occur such as the misalignment of the wheels, as well as loss of horizontality of the electric robot in case the wheels rotate 180°, since there would be an excessive height difference between the front wheels and the rear wheels.

The angle of inclination B with respect to the vertical axis v helps to keep the electric robot in a straight line when it moves, that is, the electric robot maintains a straight path when it moves. If the inclination angles B were not available, when the electric motors of the front wheels were de-energized, the electric robot would tend to rotate 180°, that is, the rear wheels would tend to overtake the front wheels. Therefore, as said wheels have with an angle of inclination B, it is favored that the rear wheels do not tend to go forward once the motors are de-energized.

Additionally, the purpose of the angle of inclination B is to generate a change in height h of the wheel 29b and, therefore, of the wheel assembly 26, when it rotates around the caster axle 27. As mentioned above, in said FIG. 4A two positions can be seen for the wheels 29b. In the first position, wheel 29b is farthest from chassis 10 (not shown) and therefore from the center of gravity of the electric robot. In the second position, the wheel 29b is rotated 180° with respect to the axis of rotation e and the first position and, in turn, is closer to the center of gravity of the electric robot. For these two positions, the wheel assembly 26 is assumed to be coupled to the rear of the electric robot.

In the first position, the load supported by the wheel 29b is less than the load supported by the wheel 29b in the second position. This difference in load distribution supported by wheel 29b is due to the fact that the distance between the wheels of the wheel assemblies arranged at the rear of the electric robot and the wheels of the wheel assemblies arranged at the front of the electric robot changes. More precisely, in the case of the embodiment of FIG. 5A, the distance between wheels 29a and wheels 29b varies when wheels 29b rotate around caster axle 27 and the load difference that is generated as a consequence is absorbed by the suspension 24 of the wheels 29b, more precisely by the suspension spring 24, which is compressed as a consequence.

If the angle of inclination B were null, there would be no height difference h of the wheel 29b when it rotates around the caster axle and the rear of the electric robot would tilt downwards, since the wheels 29b are closer to the center of gravity of the electric robot, the spring would further compress by supporting more weight and, consequently, the electric robot would lose its horizontality. The latter could affect both the stability of the electric robot when moving or making turns, as well as its performance when performing any function.

Likewise, the angle of inclination B considerably reduces the oscillatory effect, called the shimmy effect, at working speeds, for example, of up to 20 km/h, of the electric robot. It should be noted that this effect occurs on caster wheels and intensifies with increasing speed. However, due to the angle of inclination B it is made more difficult to get the wheel out of its equilibrium position, when it is moving forward, and the shimmy effect occurs at higher speeds.

Figure 4B:
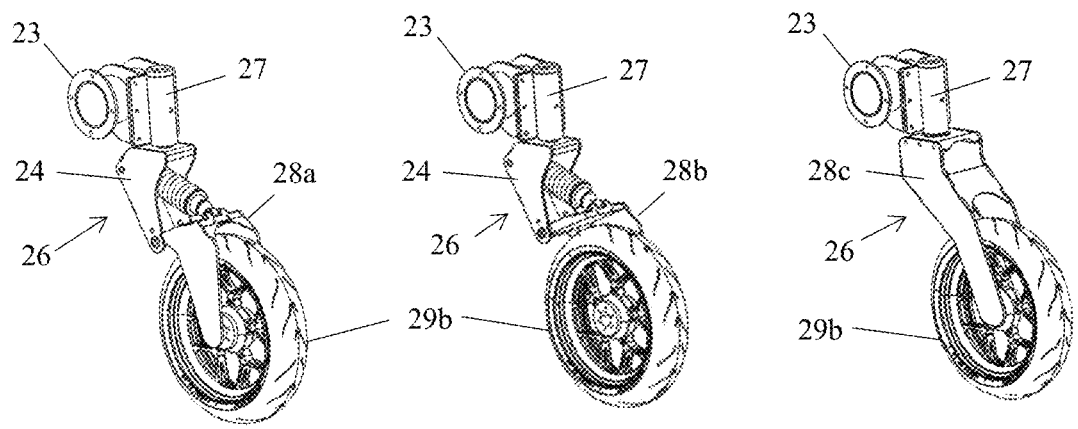
FIG. 4B shows other embodiments of the wheel assembly of FIG. 4A.

Referring now to FIG. 4B, there are illustrated three preferred embodiments for the wheel assembly 26. The embodiment on the left of the figure, which is equal to the wheel assembly 26 illustrated in FIG. 4A, is characterized by having a suspension 24, which comprises a spring and a damper, and a double fork 28a, whereby the fork holds the wheel 29b on both sides. The embodiment in the center of the figure is characterized by having a suspension 24, which comprises a spring and a damper and a cantilever fork 28b, whereby it holds the wheel 29b only on one side. The embodiment on the right of the figure is characterized by having a fixed fork 28c, whereby it holds the wheel 29b on both sides, and by not having a suspension.

Referring again and in more detail to FIGS. 5A and 5B, illustrated are an isometric perspective view and a left side view, respectively, of an embodiment of the chassis with wheel assemblies of the electric robot of the present invention that presents a certain configuration in terms of direction and traction. In particular, in each of said FIGS. 5A and 5B, it can be seen that the chassis 10 has two wheel assemblies 20 each located at opposite ends of the front part of the chassis 10, that is, at opposite ends of the front crossbar, and two wheel assemblies 26 each located at opposite ends of the rear of the chassis 10, i.e. at opposite ends of the rear crossbar. Each of said wheel assemblies 20 and 26 has a flange-like joint 23 so that it can be linked to the corresponding crossbar joints of the electric robot.

Figure 5B:
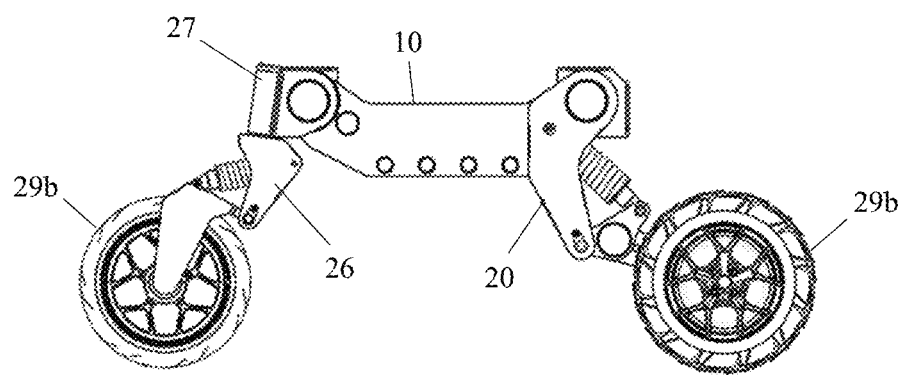
Figure 6A:
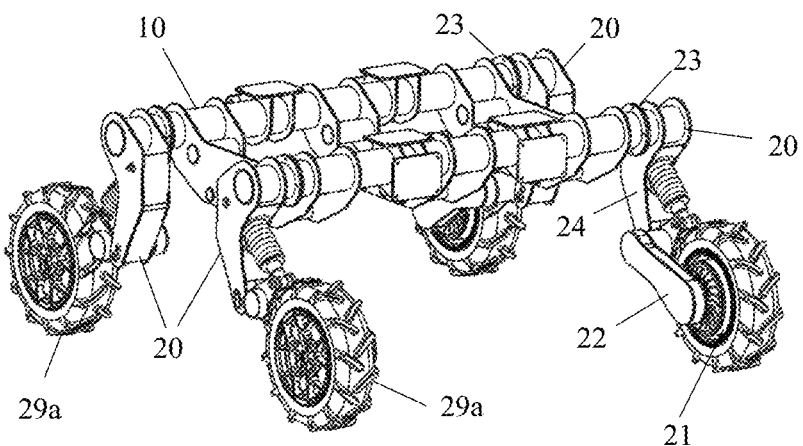
FIGS. 6A and 6B show an isometric perspective view and a left side view, respectively, of another embodiment of the chassis with wheel assemblies of the electric robot of the present invention that presents a certain configuration regarding direction and traction.
Figure 6B:
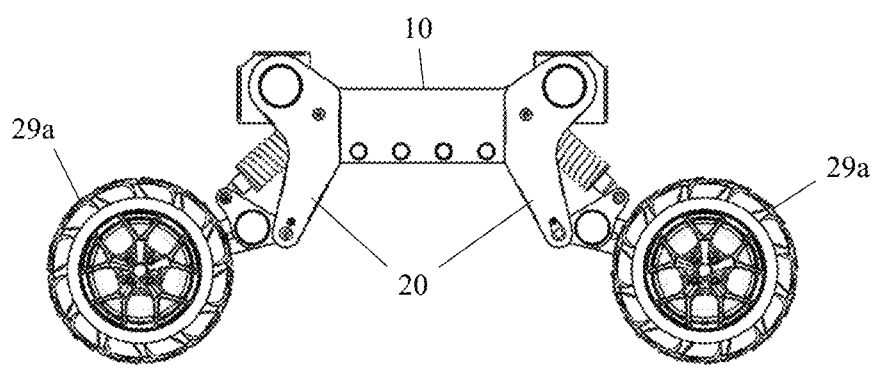

As the electric robot of said embodiment of FIGS. 5A and 5B has wheel assemblies 20 comprising driving wheels 29a at the front of the electric robot and wheel assemblies 26 comprising caster wheels 29b at the rear of the electric robot, said embodiment comprises front-wheel drive. The driving wheels 29a of the electric robot in this embodiment are of the differential drive type, that is to say, that the electric robot by means of a processing and control module, as will be seen later, can change direction when moving varying the relative speed of rotation of the electric motors 21 of the wheels 29a so that no additional steering movement is required. It should be noted that each of the electric motors 21 can rotate in the two possible directions of rotation (clockwise and counterclockwise), wherein in one of the directions it makes the electric robot advance and in the other direction, it makes it go back.

It should be noted that, despite the advantages resulting from having caster wheels 29b that have an angle of inclination B within any of the ranges described above, the wheels that are placed at the rear of the electric robot do not necessarily have to be caster wheels 29b as previously advanced and as will be seen below.

Referring again and in more detail to FIGS. 6A and 6B, these figures illustrate an isometric perspective view and a left side view, respectively, of an embodiment of the chassis with wheel assemblies of the electric robot of the present invention that presents a certain configuration in terms of direction and traction. Said embodiment is substantially similar to the embodiment illustrated in FIGS. 5A and 5B, with the exception that it comprises a wheel assembly 20 at each of the opposite ends of the front and rear of the chassis 10 each of said wheel assemblies 20 having an electric motor 21, preferably a brushless type electric motor, directly coupled to the corresponding wheel 29a. Thus, the wheel assemblies 20 located at the front are identical to the wheel assemblies 20 located at the rear of the electric robot.

In said embodiment, there is both front-wheel drive and rear-wheel drive (4-wheel drive), which corresponds to a configuration called skid steering. Consequently, since each wheel has a motor, it will have a higher power making said embodiment more convenient for higher loads than in the embodiment corresponding to FIGS. 5A and 5B. Also, the electric robot in the skid steering configuration rotates because the wheels on the same side rotate at a different speed than the wheels on the other side of the electric robot, for example, if the wheels on the left side of the electric robot rotate faster than the wheels on the right side, the electric robot will turn right. This embodiment has great traction on uneven terrain.

The electric robot of the present invention has an electrical installation that allows it to adapt to different configurations, therefore, exchanging the wheel assemblies 20 of the opposite ends of the rear part with wheel assemblies 26 comprising the caster wheels 29b is easily done.

Figure 7A:
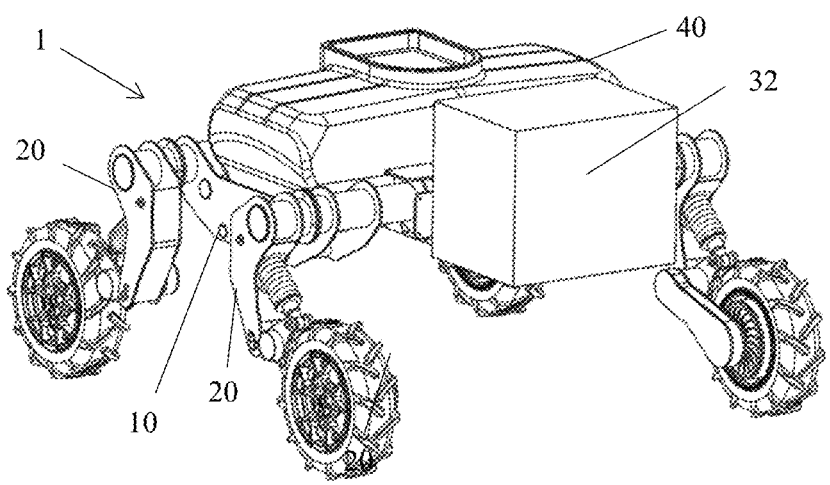
FIG. 7A shows an isometric perspective view of one embodiment of the electric robot of the present invention.

Referring now to FIG. 7A, an isometric perspective view of an embodiment of the electric robot 1 of the present invention can be seen in the skid steering configuration. Said electric robot 1 generally comprises the chassis 10, a wheel assembly 20 both at each of the opposite ends of the front and at opposite ends of the rear of the chassis 10, a battery bank 32 as a power supply and a component 40, for example a container for agricultural supplies. These elements will be described in greater detail and precision below.

Figure 8A:
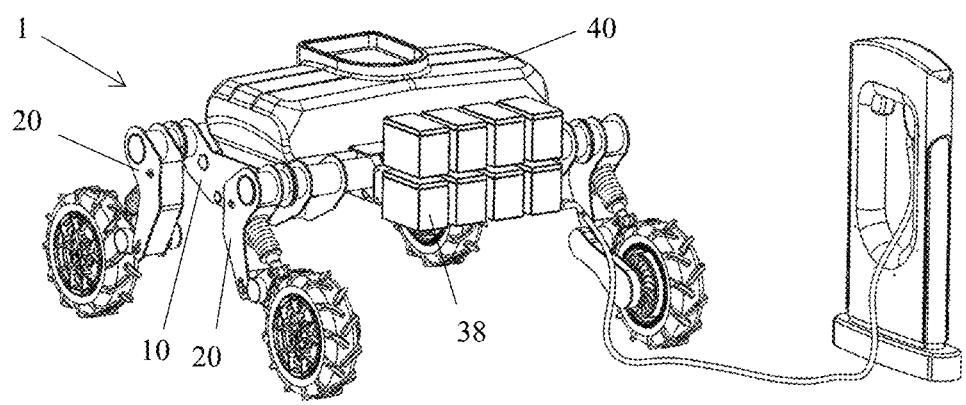
FIGS. 8A and 8B show the electric robot of the present invention in a charging station recharging its power supply.
Figure 8B:
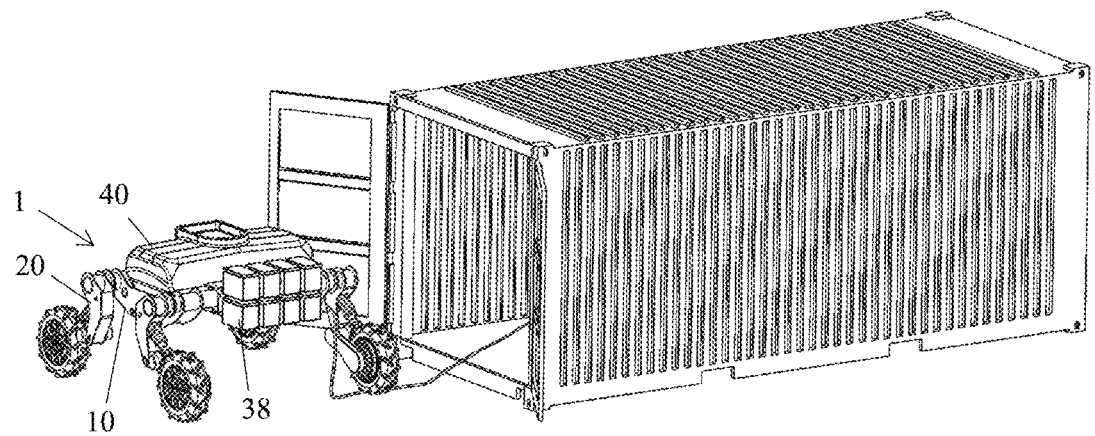

It should be noted that the electric robot 1 of the present invention is easily reconfigurable also regarding the power supply it uses to propel itself. This is so since the possibilities of the power supply of the electric robot are multiple. In one embodiment of the present invention, the power supply is selected from the group consisting of a hybrid power supply and an electrical power supply, wherein the hybrid power supply consists of a generator and rechargeable batteries, while the electrical power supply consists of rechargeable batteries, as illustrated in FIGS. 8A and 8B, or an interchangeable battery bank, as illustrated in FIG. 7A.

The batteries that the electric robot of the present invention uses as a power supply can be selected from the group that comprises lead batteries, lithium batteries, cadmium batteries, among others.

The electric robot 1 of the present invention is designed to allow the mounting of the power supply, whatever it is, in the front part thereof. Said mounting is carried out through the linking means 17 of the chassis 10 (see FIGS. 2A-2D). The mounting of the power supply to the linking means 17 is simple so that it can be done both manually and automatically.

Figure 7B:
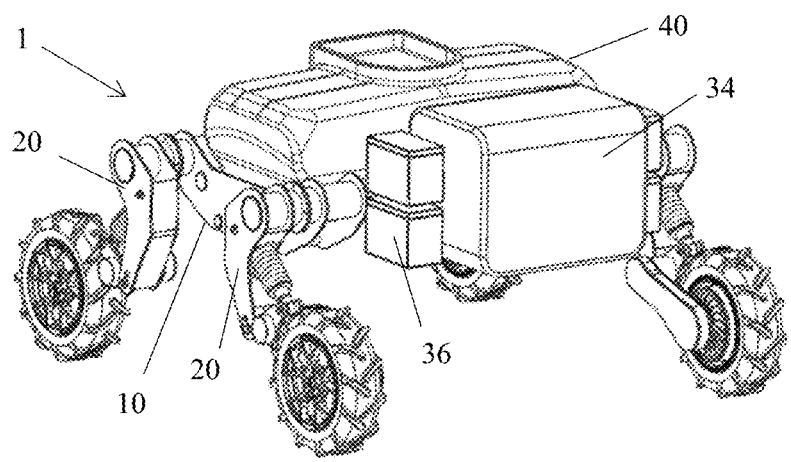
FIG. 7B shows an isometric perspective view of another embodiment of the electric robot of the present invention.

Referring now to FIG. 7B, an isometric perspective view of an embodiment of the electric robot 1 of the present invention can be seen in the skid steering configuration. Said embodiment is substantially similar to that illustrated for FIG. 7A, the only difference being the power supply used. In this case, a generator 34 and batteries 36 are used as the power supply to achieve the propulsion of the electric robot 1.

In both embodiments illustrated in FIGS. 7A and 7B, it can be seen how the electric robot 1 carries in its middle part a component 40 in the form of a container for agricultural supplies. It should be noted that instead of a container, the robot could have a tank, a hopper or other possible components, in order, for example, to contain seeds to be sown, agrochemicals to be injected or whatever corresponds to the task to be performed, for which the electric robot 1 is configured.

Referring again to FIG. 1, the embodiment of the illustrated electrical robot 1 is substantially similar to the embodiment illustrated in FIG. 7B except that it further comprises the implement 50, a boom for dispensing of agricultural supplies at the rear of the electric robot 1. The implement, in addition to that shown in FIG. 1, can be selected from a variety of implements capable of performing one or more of the following functions: spraying; weed control without agrochemicals, for example, by means of some cutting tool (blades, cutting bars, etc.) for pruning, plucking, cutting, etc.; sowing; fertilization; trailer for loading and unloading, for example, of seeds or fertilizers, which can be hooked or linked to the rear of the electric robot 1; monitoring and sensing physical and chemical properties of the soil such as nutrients, texture, color, humidity, organic matter, etc.; among other possible functions, which can be automated. Whichever implement is selected, it is preferably placed at the rear of the electrical robot 1, although it could also be, at least in part, in the middle of the electrical robot 1.

In particular, in a preferred embodiment of the present invention, the implement 50 illustrated in FIG. 1 is an agrochemical spray implement in the form of a boom which has nozzles along its length so that inject agrochemicals (fertilizers, pesticides, etc.). It should be noted that the implement 50 illustrated is an example and should not be considered as limiting in any way, since the electric robot of the present invention is designed to be easily reconfigurable so that some other implement can be installed, instead of the boom, to perform some of the functions previously described.

The electric robots commonly used in agriculture generally work at low speeds (less than 10 km/h) and with small loads, while the electric robot 1 can work at high speeds, for example, up to 20 km/h, supporting high loads, for example, 500 kg or more, not counting the electric robot's own weight (chassis, wheel assemblies, power supply and implement). For this the electric robot 1 uses electric motors of, for example and in a preferred embodiment, 6 kW of working power, therefore, an electric robot 1 according to the embodiment of FIGS. 5A and 5B or according to the embodiment of FIGS. 6A and 6B, will have, respectively, a total power of 12 kW or 24 kW (one motor per wheel), in the event that 6 kW electric motors of power. In this way the electric robot of the present invention is ideal for extensive agriculture.

Next, two tables are presented, one corresponding to the weight of the different elements that make up the electric robot and the load it carries, and the other corresponds to the dimensions of characteristic parameters for a vehicle. The values shown in said tables are by way of example only and should not be considered as limiting the electric robot of the present invention in any way, since these values would be easily modified, for example, making the electric robot bigger or smaller or replacing the material of which it is made by a lighter one, among other possibilities.

| Weights | | |
|---|---|---|
| | Chassis + wheel assemblies | 450 kg |
| | Power supply | 300 kg |
| | Load + container | 500 kg |
| | Implement | 250 kg |
| | Total | 1500 kg |

| Dimensions | | |
|---|---|---|
| | Tread width | 2100 mm |
| | Wheelbase | 2050 mm |
| | Clearance | 650 mm |
| | Tire diameter | 650 mm |
| | Spray implement | 10000 mm |

The tread width must be understood as the distance between wheels of the same axle (whether the wheels are at the front or at the rear), that is to say "gauge"; wheelbase must be understood as the distance between the axle of the wheels located at the front of the electric robot and the axle of the wheels located at the rear of the electric robot; clearance must be understood as the shortest distance between the bottom of the robot and the ground; tire diameter must be understood as the diameter of wheels 29a and 29b; and spray implement must be understood as the distance from one end to the other of the spray implement illustrated in FIG. 1.

The electric robot of the present invention is an autonomous robot since it has enough "intelligence" to independently carry out the operations for which it is intended. To do this, a user of the electric robot will configure it so that it can perform the desired task, placing an implement either to spray agrochemicals, sow, etc.; installing a power supply (be it a battery bank, a generator and batteries, etc.) so that the electric robot has a certain autonomy, that is, it has enough energy to operate either 5 consecutive hours, 10 consecutive hours, etc.; placing a container, tank or whatever corresponds, depending on the task to be carried out, in its middle part; and assigning a certain wheel configuration (wheels with differential drive and caster wheels, or skid steering) according to the conditions of the terrain on which it is going to work.

Once the configuration described above has been carried out, the robot can start operating. For this, it has a processing and control module, a GNSS unit, an inertial measurement unit, at least one sensor for environment perception, at least one sensor for monitoring the status of the electric robot and a wireless communication system (not shown in the Figures).

The control and processing module is responsible for controlling each of the robot functions and movements. First, it controls the electric motors of the wheels. This is essential since when the electric robot, in the configuration of wheels with differential drive and caster wheels, makes a turn, either to the left or to the right, the wheels will have to rotate at different speeds. For example, if the electric robot turns to the right, the electric motor of the wheel to the right of the electric robot will rotate at a slower speed than the electric motor of the wheel to the left of the electric robot, since the latter has to travel more than the wheel on the right when cornering. Also, in a skid steering configuration, the processing and control module will be responsible for driving the electric motors so that the wheels on the same side (right or left) of the electric robot rotate at the same speed when the electric robot makes a turn.

Said processing and control module also enables the different components that the electric robot may have to be operated. In particular, it is responsible for operating the implement that is placed at its rear. By way of example only, the implement of FIG. 1 in the form of a boom can be controlled to fold automatically, without the need for a person to do it manually. Also, the nozzles along its length can be selectively controlled so as to inject agrochemicals where desired.

Additionally, said processing and control module may be in data communication with an external server in which the user loads the points, in a particular terrain, on which the electric robot of the present invention must operate or perform some function. These points can be supplied in the form of geolocations on a map or other form of data representation that can be accessed by the control unit.

The control and processing module is in data communication also with the GNSS unit, the at least one environment perception sensor and the inertial measurement unit. In this way, the processing and control module allows the electric robot to be geolocated so that it can know its current location, the points on which it must work and the actions it must take in order to go to said points, for example, advance 100 meters forward, apply fertilizer at one point, then turn right, advance 50 meters and reapply fertilizer, etc.

The user of the electric robot can, for example, define rest areas, recharging areas, storage area, safe paths for the movement of the robot, areas through which the robot should avoid moving, perimeter of the work lot, work path. This is accomplished either by moving the electric robot by remote control, by having the robot follow another vehicle, or offline by marking a satellite map as described above. The electric robot could work with only part of the information, for example, the perimeter of the lot is defined and determines by itself the best working path.

The at least one environment perception sensor selected from the group comprising lidar sensors, ultrasonic sensors, a radar, RGB cameras, RGB-D cameras, thermal cameras, infrared cameras, among others, to detect possible obstacles or dangerous areas, for example, a lake, that could be in the path of the same. The processing and control module, being in data communication with the at least one environment perception sensor, receives signals from said at least one environment perception sensor and from these signals performs actions such as making turns or maneuvers of way to avoid possible obstacles and avoid possible damage to the integrity of the electric robot, and then continue with the path it was taking.

Furthermore, the at least one environment perception sensor can be used so as to allow the various operations of the electric robot to be carried out. By way of example only, in case the electric robot is configured for the agrochemical application, it can use said at least one sensor of environment perception to detect weeds, and based on said detection, to send signals to the processing module and control so that it activates the nozzles of the boom so as to inject agrochemicals on the weeds.

The at least one environment perception sensor can be used in order to determine possible paths for the movement of the robot; for command of the robot, for example, by recognizing gestures or following an object in the vehicle detection zone.

The processing and control module is also in data communication with at least one sensor for monitoring the status of the electric robot selected from the group that includes fuel level sensors, wheel pressure sensors, temperature sensors of different points of the electric robot, position sensors of the mobile parts of the electric robot, sensors of the quantity of supplies for agricultural work, among others, for decision making. By way of example only, the at least one sensor for monitoring the condition of the electric robot may allow alarms for overtemperature and low air pressure in the wheels. In turn, for example, in the case of spraying, the robot can determine which sections of an implement for agricultural work are folded and which are not.

Finally, said processing and control module allows detecting when the power supply is running low. In this way, the processing and control module sends some signal to the external server with which it is communicated so that the user of the electric robot is aware that it requires a replacement or recharge of its batteries. Also, the processing and control module has the ability to automatically return the electric robot 1 to a charging station when it determines that the remaining charge on the power supply is not sufficient to continue the work. Similarly, the processing and control module can detect whether the amount of agricultural supplies in component 40 is running low, for example, if it is running out of agrochemicals to spray.

The replacement or recharging of batteries can be seen in FIGS. 8A and 8B in which, in turn, the electric robot 1 can be seen recharging rechargeable batteries 38 by, for example, an external charger as shown in FIG. 8A or a charging station, inside a mobile container as shown in FIG. 8B, where the electric robot, in addition to recharging its batteries, can be stored or sheltered if necessary. In case the electric robot 1 has a battery bank as its power supply, said electric robot can also go to the charging station (mobile container) which would also allow replacing the battery bank with another one already charged.

The electric robot of the present invention comprises a wireless communication system comprising communication modules such as LPWAN, Bluetooth, WiFi and mobile Internet, for information exchange with a server or a remote command post.

It should be noted that, although it is not shown in any of the Figures, the electric robot of the present invention may comprise a housing on the chassis of said electric robot so that each of the elements that are installed or incorporated thereon of the chassis are housed and covered within said casing. In this way, the casing protects said elements from climatic and/or environmental conditions that could damage them and/or alter their operation.

The invention claimed is:

1. A modular and reconfigurable autonomous electric robot capable of adapting to any type of condition and work in an agricultural environment, comprising:
   a chassis with transverse and longitudinal symmetry comprising a front part, a middle part and a rear part;
   a power supply located in the front part of the chassis;
   an implement for agricultural work located in the rear part of the chassis;
   two wheel assemblies each located at transversely opposite ends of the front part of the chassis and two wheel assemblies each located at transversely opposite ends of the rear part of the chassis;
   a GNSS unit to geolocate the electric robot in real time; and
   a processing and control module that controls the electric robot and is in data communication with the GNSS unit,
   wherein each wheel assembly located in the front part of the chassis comprises a wheel with an electric motor directly coupled to the wheel, and
   wherein each wheel assembly located at the rear part of the chassis comprises a caster wheel and a caster axle, wherein the caster axle has a rotation axis that is inclined by an angle of inclination with respect to a vertical line and allows the caster wheel to rotate around said axis.

2. The electric robot according to claim 1, wherein the chassis comprises at least two crossbars.

3. The electric robot according to claim 2, wherein the chassis comprises a front crossbar and a rear crossbar which essentially constitute the front part and the rear part, respectively.

4. The electric robot according to claim 1, wherein the chassis-further comprises at least two stringers.

5. The electric robot according to claim 4, wherein the chassis comprises two lateral stringers that essentially constitute the middle part of the chassis and join the front part with the rear part.

6. The electric robot according to claim 4, wherein the chassis comprises two lateral stringers and at least one central stringer, which essentially constitute the middle part of the chassis and join the front part with the rear part.

7. The electric robot according to claim 1, wherein the power supply is selected from the group of a hybrid power supply and an electrical power supply.

8. The electric robot according to claim 1, wherein the chassis is shaped to be able to place a component such as a container, a tank or a hopper in the middle of the chassis to contain agricultural supplies.

9. The electric robot according to claim 1, wherein the implement is selected so as to perform one or more of the following functions: spraying, weed control without agrochemicals, seeding, fertilization, trailer for loading and unloading, and measurement and sensing of soil properties.

10. The electric robot according to claim 1, wherein the wheel assemblies located in the front part have a suspension formed by a spring and a damper.

11. The electric robot according to claim 1, wherein each of the wheel assemblies located in the front part of the chassis and of the wheel assemblies located in the rear part of the chassis has a suspension formed by a spring and a damper.

12. The electric robot according to claim 1, wherein the angle of inclination of the caster axle with respect to the vertical line is between 1° and 20°.

13. The electric robot according to claim 1, wherein the electric motor directly coupled to a corresponding wheel is a brushless type electric motor.

14. The electric robot according to claim 1, wherein the processing and control module is in data communication with an external server.

15. The electric robot according to claim 1, wherein the robot further comprises an inertial measurement unit that is in data communication with the processing and control module.

16. The electric robot according to claim 1, wherein the robot further comprises at least one environment perception sensor selected from the group comprising lidar sensors, ultrasonic sensors, a radar, RGB cameras, RGB-D cameras, thermal cameras and infrared cameras, where said at least one environment perception sensor is in data communication with the processing and control module.

17. The electric robot according to claim 1, wherein the robot further comprises at least one sensor for monitoring the condition of the electric robot selected from the group comprising fuel level sensors, wheel pressure sensors, temperature sensors of different points of the electric robot, position sensors of the mobile parts of the electric robot and sensors of the quantity of supplies for agricultural work, wherein said at least one sensor for monitoring the condition of the robot is in data communication with the processing and control module.

18. The electric robot according to claim 1, wherein the robot further comprises a wireless communication system comprising communication modules such as LPWAN, Bluetooth, WiFi and mobile Internet.

* * * * *